United States Patent
Khajehgani et al.

(10) Patent No.: US 12,129,948 B2
(45) Date of Patent: Oct. 29, 2024

(54) PUSH-IN TUBE CONNECTOR PORT

(71) Applicant: KA Group AG, Zürich (CH)

(72) Inventors: Ali Khajehgani, Hunndalen (NO); Geir Liaklev, Gjøvik (NO); Ole Edvard Bakken, Brumunddal (NO); Odvar William Lundby, Hunndalen (NO); Henning Rud, Lillehammer (NO); Geir Kristoffersen, Kapp (NO); Tommy A. Rafteseth, Gjøvik (NO)

(73) Assignee: KA Group AG, Zurich (CH)

( * ) Notice: Subject to any disclaimer, the term of this patent is extended or adjusted under 35 U.S.C. 154(b) by 90 days.

(21) Appl. No.: 17/980,227

(22) Filed: Nov. 3, 2022

(65) Prior Publication Data

US 2023/0137536 A1 May 4, 2023

(30) Foreign Application Priority Data

Nov. 3, 2021 (EP) .................................. 21206270

(51) Int. Cl.
*F16L 37/092* (2006.01)
*F16L 37/084* (2006.01)

(52) U.S. Cl.
CPC ....... *F16L 37/0925* (2013.01); *F16L 37/0845* (2013.01); *F16L 37/0927* (2019.08)

(58) Field of Classification Search
CPC ............... F16L 37/0925; F16L 37/0927; F16L 37/0845; F16L 55/11; F16L 21/03; F16L 21/007; F16L 21/04
See application file for complete search history.

(56) References Cited

U.S. PATENT DOCUMENTS 6,142,538 A * 11/2000 Volgstadt ............ F16L 37/0925
2005/0140140 A1 * 6/2005 Robison .............. F16L 37/0925
(Continued)

FOREIGN PATENT DOCUMENTS

EP 0631081 A1 12/1994
EP 0976961 A2 2/2000
(Continued)

OTHER PUBLICATIONS

English language abstract for EP 0 631 081 A1 extracted from espacenet.com database on Nov. 7, 2022, 2 pages.
(Continued)

*Primary Examiner* — Zachary T Dragicevich
(74) *Attorney, Agent, or Firm* — Howard & Howard Attorneys PLLC

(57) ABSTRACT

A push-in tube connector port for connecting a tube to a pressurized fluid system is provided. The push-in port includes a central recess for receiving the tube, a sealing arrangement inside of the recess, a locking ring engaged within the recess, and a tube gripping ring having an inwardly directed gripping edge. The locking ring has a U-shaped cross-section. A number of circumferentially distributed slots subdivides an outer ring wall of the locking ring into a number of outer ring wall portions configured to be elastically deflected towards the center by the flange of an insertion end opening, when the annular double ring component is pressed into the recess, and to elastically flex back outwardly once the outer ring wall portions have passed the flange such that an upper edge of each of the outer ring wall portions engages an inner surface of the flange to secure the locking ring in the recess.

12 Claims, 9 Drawing Sheets

(56) References Cited

U.S. PATENT DOCUMENTS

2013/0207385 A1*  8/2013  Williams ............ F16L 37/0927
2021/0080039 A1*  3/2021  O'Neill ............... F16L 37/0925

FOREIGN PATENT DOCUMENTS

| EP | 1872046 B1 | 6/2010 |
| WO | 2006112727 A1 | 10/2006 |
| WO | 2009068932 A1 | 6/2009 |
| WO | 2016041603 A1 | 3/2016 |
| WO | 2016206824 A1 | 12/2016 |

OTHER PUBLICATIONS

English language abstract for WO 2016/206824 A1 extracted from espacenet.com database on Nov. 7, 2022, 2 pages.
European Search Report for Application EP 21 20 6270 dated Mar. 21, 2022, 2 pages.

* cited by examiner

PUSH-IN TUBE CONNECTOR PORT

CROSS-REFERENCE TO RELATED APPLICATIONS

This application claims priority to and all the benefits of EP Application No. 21206270.7, filed on Nov. 3, 2021, which is incorporated herewith by reference in its entirety.

FIELD OF DISCLOSURE

The following relates to a push-in tube connector port for connecting a tube to a pressurized fluid system.

BACKGROUND

Such tube connectors are in widespread use in the automotive industry, for example for connecting a tube of a hydraulic or pneumatic system to its pressure fluid source and to an actuator. A push-in tube connector port as described above is disclosed in WO 2016/206824 A1 in the embodiment of FIG. 4, and is also disclosed in EP 0 631 081 A1. The locking ring in WO 2016/206824 A1 is held in the recess by the engagement of a circumferential ridge on the outer wall of the locking ring that is received in a circumferential groove in the inner wall of the recess close to the insertion end opening of the recess. The locking ring is a rigid annular member with a circumferential recess in its inner wall in which the environmental seal O-ring is received. The main seal O-ring is engaged by an inner end face of the locking ring to retain the main seal O-ring in the recess.

The tube extends, in its fully inserted state, beyond the tube gripping ring. The tube gripping ring cooperates with a conical wall portion in the recess such that a force acting on the tube to pull it out of the tube connector port causes the tube gripping ring to move with the tube and along the conical wall portion which compresses the gripping such that it engages the tube even tighter to thereby hold the tube in the tube connector port and prevent it from being pulled out.

The connector port is composed of two parts, an outer connector port body comprising a central recess into which an inner insert part is screwed, the inner insert part comprising the recess for receiving the tube. For removing the tube from the push-in tube connector port the insert part with the tube end retained therein first has to be unscrewed from the connector port body before the tube can be removed from the recess of the insert part. The tube gripping ring is a separate member from the insert part, and the conical wall portion which is located at an inner end portion of the insert part disengages from the tube gripping ring when the insert part is unscrewed and separated from the connector body part, so that the tube can be pulled out of the recess of the insert part.

Such push-in tube connector port has several disadvantages. The locking ring is a rigid member, for example made of metal. Even if the locking ring is formed as a split ring considerable force is needed to compress it to permit it to pass through the insertion end opening of the recess, whereafter it
is released and expands into a secured engagement within the recess. Thus, the insertion of the locking ring is a complicated process and requires application of a tool in order to sufficiently compress the locking ring for insertion.

Another disadvantage is that a metal locking ring is very rigid. The locking ring surrounds an inserted tube at the insertion opening of the recess with a small gap between the inner surface of the locking ring and the outer wall of an inserted tube. The locking ring forms a rigid bearing or support member for the inserted tube when the tube is slightly bent so that a portion of the outer wall of the tube comes into abutment against a portion of the locking ring. Because such rigid locking ring as a bearing member is not able to yield in any way in response to bending forces acting on the tube outside of the recess, any elastic yielding to absorb the bending forces on the tube has to be absorbed by the tube itself. In order to prevent that tubes upon absorption of bending forces break or buckle when being pressed against the locking ring the tubes have to be designed to be able to withstand expected bending forces on the tube; this requires that the wall thickness of the tubes has to be higher than would be needed for other reasons which makes the tubes stiffer and more expensive.

In addition it would be advantageous to be able release the tube from the push-in tube connector without need to unscrew or disassemble any parts of the connector port. It is known that release tools can be used which have an insertion portion configured such that it can be introduced into the gap between the tube and the locking ring, and which can be advanced along the tube until its end contacts the gripping ring. By pushing the bending ring further into the recess it is moved along the conical wall portion, thereby expands and releases the tube which can then be pulled out. An example of such release tool is described in EP 1 872 046 A1. The presence of a rigid locking ring impedes the application of a release tool because a rigid locking ring is not able to yield to facilitate advancement of the insertion portion of the release tool past the locking ring and into the recess.

Finally, it turned out that locking rings in the form of metallic split rings are not secured in the recess in a safe and reliable manner, but frequently fail and are pressed out of the recess at high pressures.

In view of these and other disadvantages it is an object of the present invention to design a push-in tube connector in such a manner that its assembly, in particular the introduction of a locking ring, is simplified.

These objects are solved by the push-in tube connector of the subject disclosure.

SUMMARY OF DISCLOSURE

According to the present invention the central recess of the tube connector port is provided with an inwardly projecting circumferential flange at the opening of the insertion end of the recess. The flange can continuously extend around the opening or can be composed of a plurality of circumferentially distributed adjacent flange portions. The locking ring cooperates with this flange and has the following design: The locking ring comprises an annular double ring component formed by an elastic plastic material profile having a U-shaped cross-section and forming the locking ring with an inner ring wall and an outer ring wall connected to each other by a bottom wall portion of the U-shaped cross-sectional profile. The outer ring wall is subdivided by a number of circumferentially distributed slots into a number of outer ring wall portions configured to be elastically deflected towards the center by the flange at the insertion end opening, when the annular double ring component is pressed into the insertion end opening of the recess, and to elastically flex back outwardly once the outer ring wall portions have passed the flange. After the deflected outer ring wall portions flexed back an upper edge of each of the outer ring wall portions engages an inner surface of the flange to let the locking ring rest on the flange to secure the locking ring in the recess. With this design no special tool is needed to install the locking ring because the locking ring can simple be pressed into the insertion end opening, whereupon the flange contacts the outer ring wall portions and urges them to flex inwardly to allow the locking ring to pass the flange, and when the upper edges of the outer ring wall portions have passed an inner edge of the flange the outer ring wall portions flex back outwardly which places the upper edges of the outer ring wall portions against the inner surface of the flange, and by this engagement of the outer ring wall portions behind the flange the locking ring is securely retained in the recess. In this manner the locking ring may be inserted and secured in the recess by a snap-in action.

The design of the push-in tube connector port according to the present invention also allows use of a release tool to release the tube for pulling it out. The application of a release tool having an insertion portion is facilitated because, when the insertion portion of the release tool is advanced through the gap between the inner ring wall of the locking ring and the tube inserted, the inner ring wall can, if necessary, be elastically deformed by the advancing insertion portion of the release tool.

Another advantage of the push-in tube connector port according to the present invention is that it avoids any potential problems with tolerances of the outer diameter of the tube locking ring and the inner diameter of the recess of the connector port. Such tolerances may be critical in case of a rigid locking ring, whereas in the design of the tube gripping ring push-in tube connector port according to the present invention any tolerances may be absorbed by the elastic locking ring.

When the locking ring has been inserted and is retained by the engagement of the outer ring wall portions behind the inner surface of the flange at the insertion end opening of the recess, the inner ring wall is disposed inside of the insertion end opening and is dimensioned such that a tube can be inserted and advanced into the recess. In this arrangement the inner ring wall of the locking ring surrounds the inserted tube with a small annular gap between the inner ring wall and the inserted tube.

In a preferred embodiment the elasticity of the material and the wall thickness of the U-shaped cross-sectional profile of the locking ring are selected such that the inner ring wall is, when the tube is bent and contacts the inner ring wall, capable of following the bending movement of the tube by displacement of the inner ring wall with respect to the outer ring wall. When the tube is bent by forces acting on the tube outside of the recess, the bending tube comes in contact with the inner ring wall of the locking ring. With this arrangement of the locking ring, being formed by a ring of a profile of elastic plastic with a U-shaped cross-section, the locking ring is an elastic bearing member for the inserted tube which is capable of yielding when the tube is bent and comes into abutment against a portion of the inner ring wall. The inner ring wall of the locking ring on the one hand can be displaced against the outer ring wall when a bending tube contacts the inner ring wall which thereby is moved closer to the outer ring wall in the region where the bending tube contacts the inner ring wall and which, in the diametrically opposite region, is moved away from the opposite outer ring wall portion, i.e. the center of the inner ring wall is slightly displaced with respect to the center of the outer ring wall by elastically deformation of the bottom wall. In addition, the inner ring wall can to a certain extend tilt with respect to the outer ring wall, i.e. the central axis of the inner ring wall can be inclined with respect to the central axis of the outer ring wall, when the tube is bent, and thereby the inner ring wall surrounding the bending tube can to a certain extend follow the bending of the tube. These elastic properties of the locking ring therefore make the locking ring a yielding or deformable bearing member. With such a design it is possible to use tubes with thinner tube walls with less risk that the tube breaks or buckles when it is subject to bending forces. In a preferred embodiment the outer ring wall portions of the locking ring are outwardly inclined with respect to the central axis of the outer ring wall such that the outer ring wall portion are flaring in a direction away from the bottom wall portion. With this design the locking ring is, when it approaches the insertion end opening of the recess, contacting the flange with its inclined outer ring wall portions which thereby are flexed inwardly, closer to an orientation parallel to the central axis of the locking ring, thereby reducing the lateral extension of the outer ring wall portions.

In a preferred embodiment the wall of the recess adjacent to the flange has a frusto-conical shape flaring towards the flange. The outer ring wall portions are oriented in a complementary manner, namely the outer ring wall portions of the locking ring are outwardly inclined with respect to the central axis, i.e. the outer wall portions are flaring towards their upper edges remote from the bottom wall portion, wherein the outer ring wall portions are inclined to such extent that, when they elastically flex back outwardly once the outer ring wall portions have passed the flange, also come into abutment on the flaring inner wall of the recess adjacent to the flange. In this manner the locking ring is secured in the recess, wherein the outer surfaces of the outer wall portions come into abutment against the flaring inner wall of the recess and the upper edges of the outer wall portions come into abutment against the inner surface of the flange of the recess.

In a preferred embodiment the sealing arrangement comprises a spacer ring between the environmental sealing ring and the main sealing ring.

Furthermore the bottom wall portion of the locking ring is in abutment on the environmental sealing ring to retain the sealing ring arrangement inside the recess. Alternatively a further spacer ring could be placed between the bottom wall portion of the locking ring and the environmental sealing ring.

In a preferred embodiment the inner wall of the central recess is in a region between the tube gripping ring and the abutment end provided with an inwardly projecting feedback projection arranged to create a mechanical feedback signal by creating an increased resistance force against further advancing movement of the tube due to elastic deformation of the tube wall as a result of the tube sliding over the feedback projection.

In a preferred embodiment a guiding projection is provided on the inner wall of the recess disposed diametrically opposite to the feedback projection and includes a rising portion of increasing projection height from the inner wall of the recess to ensure that the tube contacts the feedback projection when it is pushed into the recess. Such guiding projection can for example be useful when tube is not perfectly cylindrical but has for example a slightly oval cross-section which may have the result that the tube could pass the feedback projection without contacting it. The guiding projection urges such tube towards the feedback projection to ensure that it interacts with the feedback projection.

In a preferred embodiment the push-in tube connector port is provided with a protection and assembly plug inserted into the recess before the push-in tube connector port is put into use, i.e. during storage and transportation. The protection plug inserted into the recess comprises an enlarged head portion for covering and closing the insertion end opening of the recess to prevent entry of dirt, dust and foreign particles. The protection plug further comprises an inner stem portion extending from the enlarged head portion and having a diameter allowing the stem portion to pass through the sealing arrangement and to abut against the environmental sealing ring and the main sealing ring to hold the environmental and main sealing rings under precompression. The stem portion has the same outer diameter as a tube which is suitable for use with the tube connector port, and thus the sealing arrangement is kept by the stem portion in a state as if a tube has already been inserted. The protection plug may be removed before the push-in tube connector port is first used for inserting a tube. Because the protection plug held the sealing rings with its stem portion under pre-compression the compressed sealing rings remain for a certain time compressed so that the insertion of the tube is facilitated because less force is needed for inserting the tube (no force or less force is needed to compress the sealing rings).

In a preferred embodiment the stem portion of the protection and assembly plug is provided with two circumferentially extending grooves dimensioned into positioned on the stem to receive the environmental sealing ring and the main sealing ring, respectively, and being configured to store lubricant for the environmental sealing ring and the main sealing ring. For this purpose the wall of the stem in the region of the grooves may be provided with indentations or corrugations providing space for holding lubricant.

According to the present invention also a method for making a push-in tube connector port according to the present invention is provided. This method comprises the steps of:
  providing a protection and assembly plug having an enlarged head portion for covering and closing the insertion end opening and a stem portion extending from the enlarged head portion;
  placing the locking ring around the stem portion in an orientation such that an annular opening between the inner ring wall and the outer ring wall faces a surface of the enlarged head portion surrounding the stem portion; and
  inserting the stem portion into the recess and advancing the protection and assembly plug further until the enlarged head portion comes into abutment on a surface of the push-in tube connector port surrounding the insertion and opening, thereby advancing the outer ring wall, the outer ring wall portions of which are flexing inwardly while passing the flange, passed the flange of the insertion end opening of the recess such so that the outer ring wall portions flex back outwardly and the upper edges of the out ring wall portions come into abutment on the inner surface of the flange in the recess.

In a preferred embodiment of this method further components of the push-in tube connector port are placed in the recess in a single step together with the locking ring. In this method, following placing the locking ring adjacent the enlarged head portion around the stem portion, the environmental sealing ring, a spacer ring, and the main sealing ring, and finally an insert sleeve are placed in this sequence around the stem portion. The insert sleeve has an inner wall providing the conical wall portion of the recess, and the tube gripping ring is inserted into the insert sleeve and thereby also disposed around the stem portion of the assembly plug. When the assembly plug is disposed such that its stem portion is oriented upright, the tube connector port body may be, with the insertion end opening of the recess facing the stem portion, be lowered such that the stem portion of the assembly plug with the assembled inner components of the push-in tube connector are introduced into the recess, and finally the locking ring is moved passed the flange of the insertion end opening of the recess, to thereby engage the locking ring by a snap-in action in the recess. In this manner all essential inner components of the push-in tube connector port may be assembled and placed in the recess of the tube connector port in a single step, whereafter the assembly plug is pulled out again, while the locking ring remains retained behind the flange of the recess.

BRIEF DESCRIPTION OF THE DRAWINGS

In the following the invention will be described with reference to an embodiment shown in the drawings in which.

DETAILED DESCRIPTION

Figure 1:
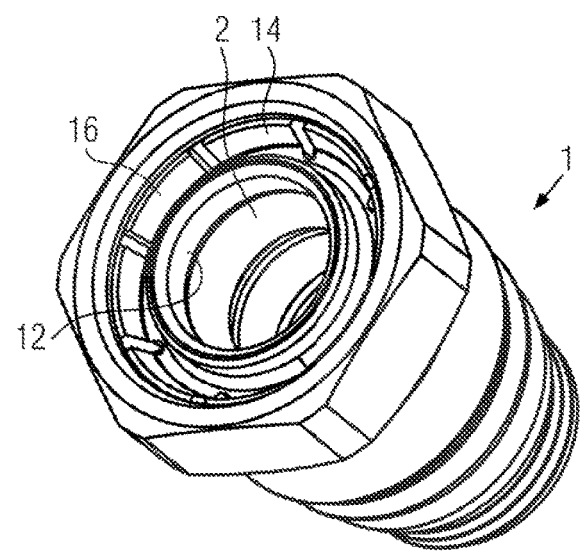
FIG. 1 shows a perspective view of a push-in tube connector port according to the present invention.
Figure 2:
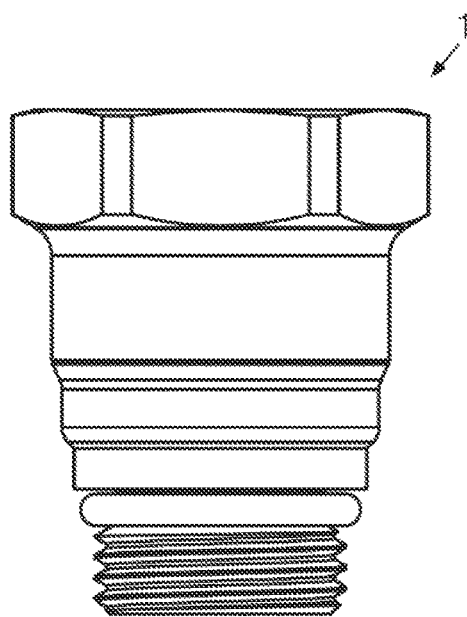
FIG. 2 shows a side view of the push-in tube connector port of FIG. 1.

The embodiment of the push-in tube connector port according to the present invention will first be described with reference to FIGS. 1 to 4. The push-in tube connector port (in the following referred to as the "connector port") has a central, throughgoing recess 2 having an insertion end opening 4 for inserting a tube and at the opposite end an opening communicating with a pressurized fluid system when the tube connector port is connected thereto by screwing it with its external thread into a corresponding internal thread of a recess in a housing part of the pressurized fluid system.

Within the recess 4 there may be mounted a carrier or support sleeve (not shown in the Figures) which is disposed coaxially within the recess 4 and which has an outer diameter adapted to the inner diameter of the tube such that the tube, when it is introduced into the recess 4 and advanced therein, receives the support sleeve and slides along the support sleeve when it is advanced within the central recess 2. The advancing movement of the tube being inserted into the central recess 2 is terminated when the front end of the tube comes into abutment against an abutment end 6 of the recess 2 where the recess 2 is continued by a smaller diameter conduit portion of the connector port 1.

Figure 3:
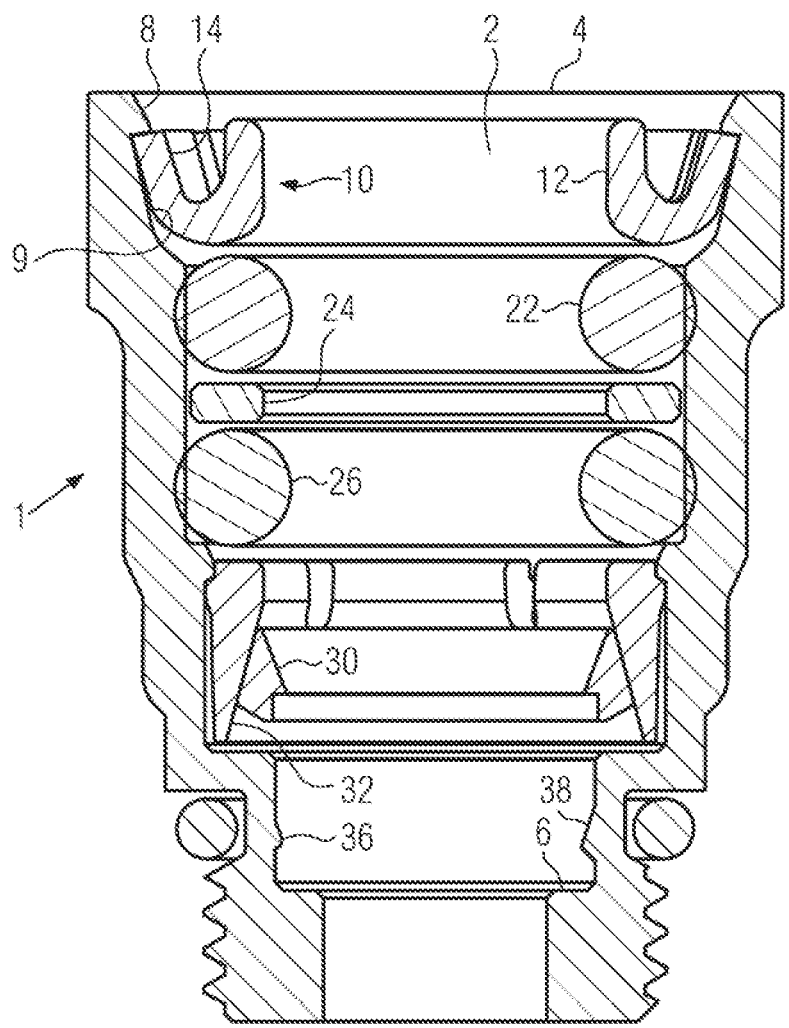
FIG. 3 shows a cross-sectional view of the push-in tube connector port of FIG. 1.

The internal components of the connector port will now be described with reference to the cross-sectional view of FIG. 3 and the exploded view of FIG. 4. Closest to the insertion end opening 4 of the recess 2 there is a locking ring 10 which will be described in detail below. Further inside of the recess there is a sealing arrangement comprising and environmental sealing ring 22 and a main sealing ring 26. In the embodiment shown there is further provided a spacer ring 24 between the environmental sealing ring 22 and the main sealing ring 26. The purpose of the environmental sealing ring 22 is to prevent entering of dirt particles when a tube is inserted into the recess 2, wherein the environmental sealing ring 22 is in abutment against the outer wall of the inserted tube to seal the gap between the inserted tube and the inner wall of the recess 2.

The main sealing ring 26 is preventing passage of pressurized fluid from the pressurized fluid source which communicates with the reduced diameter conduit portion adjacent to the bottom end 6 of the recess 2.

Further inside the central recess 2 there is provided an insert sleeve 34 having a conical wall portion 32 on its inner wall. The insert sleeve 34 is resting on a shoulder in the central recess 2. The insert sleeve comprises an outer circumferential projection which engages with an inner circumferential projection in the central recess 2 to hold the insert sleeve 34 in place. The conical wall portion 32 of the insert sleeve 34 cooperates with a tube gripping ring 30 which has a conical outer wall portion and a gripping edge at its inner wall. The outer wall of the tube gripping ring 30 is in contact with the conical wall portion 32 of the insert sleeve 34. When a tube has been inserted into the tube connector 1 to its fully inserted position in abutment against the abutment end 6 the tube gripping ring 30 retains the tube within the recess 2. When a force attempts to pull the inserted tube out the tube gripping ring 30 which is with its gripping edge in an engagement with the tube, the tube gripping ring 30 is urged to follow an axial movement of the tube, whereby the tube gripping ring 30 is moved along the conical wall portion 32 of the insert sleeve 34, whereby the tube gripping ring 30 is further compressed, thus engaging the tube with its gripping edge even tighter, thereby resisting the force attempting to pull out the tube. The tube gripping ring 30 can be compressed to a smaller diameter because it is a split ring with a circumferential gap, as can be seen in the exploded view of FIG. 4.

Figure 4:
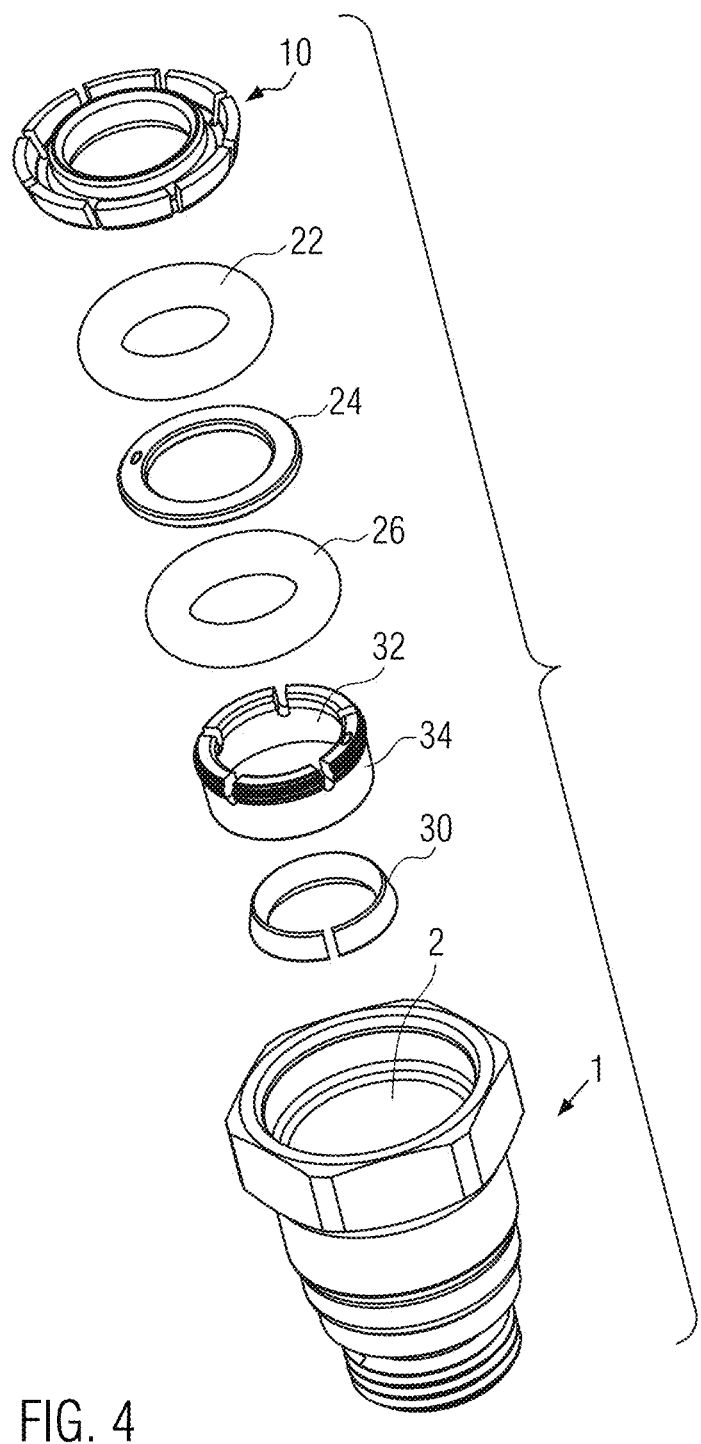
FIG. 4 shows an exploded view of the push-in tube connector port of FIG. 1.

The insert sleeve 34 has at its end with the circumferential projection slots in its wall, as can be seen in the exploded view of FIG. 4, which allow that the wall portions of the insert sleeve 34 between the slots may elastically flex inwardly when the insert sleeve 34 is pressed into the recess and passing the circumferential projection at the inner wall of the recess. In this manner a snap-in connection of the insert sleeve 34 within the central recess 2 is achieved.

At a certain distance above the abutment end 6 of the central recess there is provided a feedback projection 36 on the inner wall of the central recess 2. The feedback projection 36 can have the shape of a hemisphere and can be formed integrally with the inner wall of the recess 2 or can be a separate member fixed on the inner wall of the recess. Diametrically opposite to the feedback projection 36 there is a guiding projection 38 provided on the inner wall of the recess. The guiding projection 38 has a rising ramp portion and ensures, when an advancing tube is passing the guiding projection 38, that the tube is urged against the opposite inner wall of the central recess 2, thereby ensuring that the front end of the advancing tube has to pass the feedback projection 36 which requires that the tube has to be elastically deformed to some extent to be able to pass the feedback projection 36. This elastic deformation of the advancing tube gives a feedback to the operator who advances the tube into the central recess 2, the feedback being an increased resistance which requires an increased force to be applied by the operator when the inserted end of the tube passes the feedback projection 36. This gives a mechanical feedback feeling to the operator that the tube being inserted is approaching the abutment end and thus the fully inserted position.

Feedback mechanisms which create some signal when a tube has been properly inserted into a tube connector are well known, typically including a feedback element which is broken off by the advancing movement of the tube being inserted when the tube approaches the fully inserted position; a tube connector with such feedback element is described in WO 2009/068932 A1. The breaking of the feedback component creates an audible signal. However, working places where tubes are connected to tube connectors are often loud environments and workers may wear hearing protection so that an audible feedback signal may be difficult to sense. Therefore, a mechanical feedback by a projecting feedback component that creates an increased resistance for the advancing tube being inserted is preferred because the worker can "feel" that the tube passes the feedback element and thus approaches the fully inserted position.

The locking ring 10 of the tube connector shown in FIGS. 1-4 ensures that the inner components of the tube connector, in particular the environmental sealing element 22 and the main sealing element 26 are kept in place even if fluid under high pressure flows through the recess 2, i.e. the locking ring 10 prevents that any of the sealing rings 22 and 26 is blown out of the recess 2.

The design of the locking ring 10 will now be described in more detail with reference to FIGS. 5a-5c which show perspective views of the locking ring 10 from different points of view. The locking ring 10 comprises an annular double ring component that is formed by a profile of elastomeric plastic material, the profile having a U-shaped cross-section which forms an inner ring wall 12, an outer ring wall 14 and a bottom wall portion 18 (see FIG. 5c) connecting the inner ring wall 12 and the outer ring wall 14. In the outer ring wall 14 a number of circumferentially distributed cutouts or slots are formed so that the outer ring wall 14 is in fact composed of a number of outer ring wall portions 16. The slots in the outer ring wall 14 improve the flexibility of the outer ring wall so that the outer ring wall portions 16 may more easily be elastically deflected towards the center of the locking ring when the locking ring 10 is inserted into the recess 2 of the tube connecter by pressing it into the recess. The recess 2 of the tube connector comprises an inwardly projecting circumferential flange 8 at the insertion opening 4, the flange 8 forming an inwardly projecting shoulder in the insertion end opening 4 of the recess 2, as can be seen in the cross-sectional of FIG. 3. When the locking ring 10 is inserted into the insertion end opening 4 of the tube connector from above the outer surfaces of the outer ring wall portions 16 come into abutment against the inwardly projecting circumferential flange 8, and are deflected inwardly when the locking ring 10 is pressed further into the recess 2. This elastic inward deflection of the outer ring wall portions 16 of the outer ring wall 14 allows the locking ring 10 to pass the inwardly projecting circumferential flange 8. If the outer ring wall portions 16 have completely passed the circumferential flange 8 they immediately flex back when their upper edge has passed the shoulder of the inwardly projecting flange 8 so that the upper edges (remote from the bottom wall portion 18) of the outer ring wall portions 16 come into abutment against the inner surface of the circumferential flange 8. At the same time the outer circumferential surface of the outer ring wall portions 16 come into abutment against the inner wall of the recess 2, which inner wall in the embodiment shown is formed as a conically flaring circumferential wall portion 9 in the region adjacent to the circumferential flange 8. In this manner an engagement of the locking ring 10 within the recess 2 is effected by a snap-in action. This snap-in connection may be obtained without use of any special tool.

The engagement of the upper edges of the outer ring wall portions 16 behind the shoulder of the circumferential flange 8 creates a form-locking engagement of the locking ring 10 against axial movements out of the recess 2.

Figure 5A:
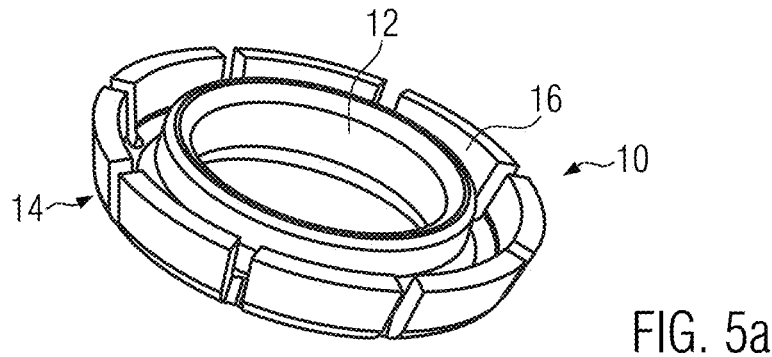
FIGS. 5a-5c show three perspective views of a locking ring utilized in the embodiment of FIGS. 1-4.
Figure 5B:
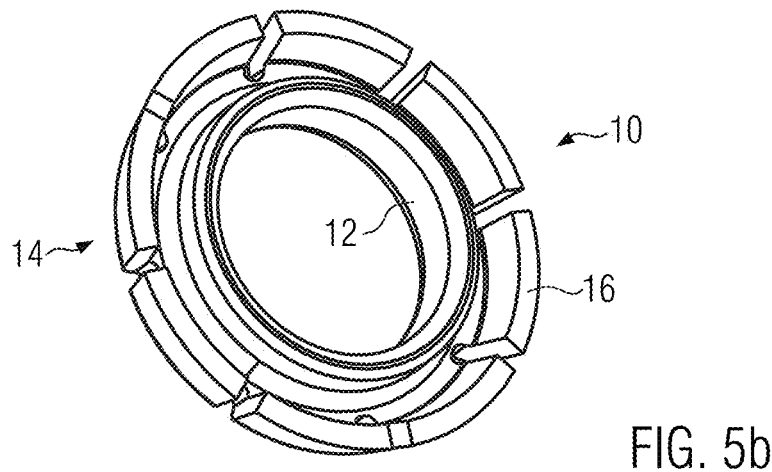
Figure 5C:
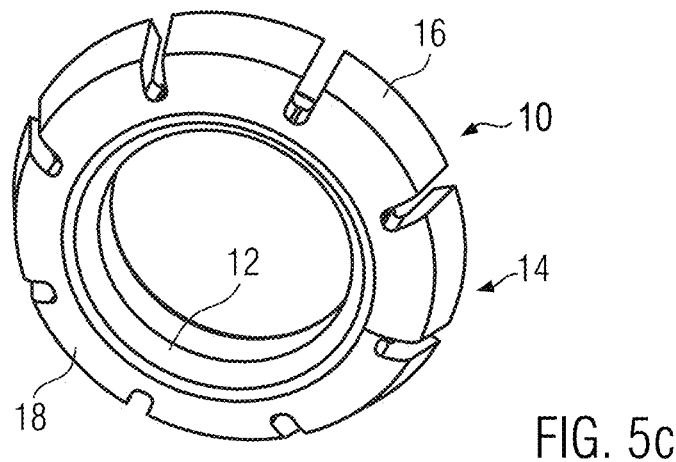

In the embodiment shown in FIGS. 5a-5c the outer ring wall portions 16 are slightly outwardly inclined such that the outer ring wall portions 16 are flaring in a direction away from the bottom wall portion 18. This inclined orientation of the outer ring wall portions 16 is reduced during the insertion process when the outer ring wall portions 16 are pressed against the circumferential flange 8 which causes an inward deflection of the outer ring wall portions to a more vertical orientation or even beyond a vertical orientation parallel to the central axis of the central recess 2, when the locking ring 10 is urged into the insertion opening 4 to pass the circumferential flange 8.

The double ring structure of the locking ring 10 being formed a plastic material profile with U-shaped cross-section can be formed as an integral component of elastomeric material, for example by injection molding.

When a tube has been inserted into the tube connector the outer wall of the tube is in the region of the locking ring 10 very close to the inner wall of the inner ring wall 12, leaving only a small gap so that a release tool may be inserted in the gap region to release the tube from the gripping ring 30 so that the tube may be pulled out, as will be described in more detail below. In case a force is acting on an inserted tube outside of the tube connector and in a direction generally perpendicular to a central axis of the tube this causes bending of the tube. As a result a portion of the outer wall of the bent tube contacts a portion of the inner ring wall 12 of the locking ring 10. Due to the design of the locking ring, being formed by a double ring member having an inner ring wall 12 and an outer ring wall 14 and due to the elastic material of the locking ring, the inner ring wall 12 may yield elastically in case a bent tube presses against a portion of the inner ring wall 12. In particular, the inner ring wall 12 can to a certain extent be displaced with respect to the outer ring wall 14 by elastic deformation, in particular in the region of the bottom wall portion 18 of the locking ring 10. In addition, the inner ring wall 12 may to a certain extend follow a tilting movement of a bent tube. Thus, the inner ring wall 12 of the locking ring 10 forms a yielding or elastic bearing for the tube which is in this manner better supported as compared to a rigid bearing because in a rigid bearing member a tube would more likely be damaged by breaking or buckling in the contact region with a rigid bearing. The support provided by the elastic locking ring according to the present invention therefore allows to use tubes with thinner walls as compared to tube connectors with rigid locking rings.

Figure 6A:
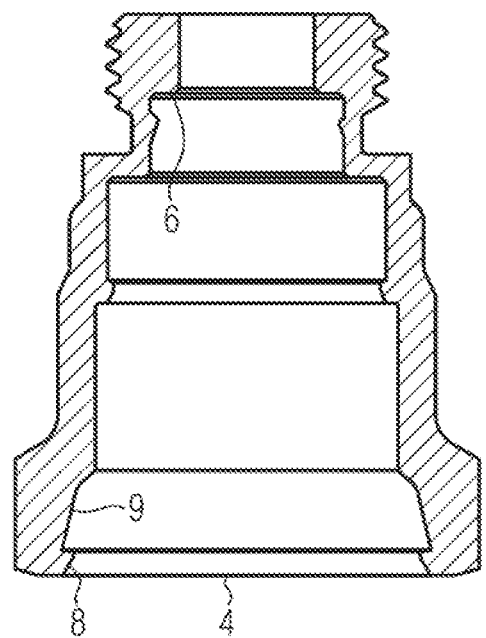
FIG. 6a shows a protection and assembly plug.
Figure 6A:
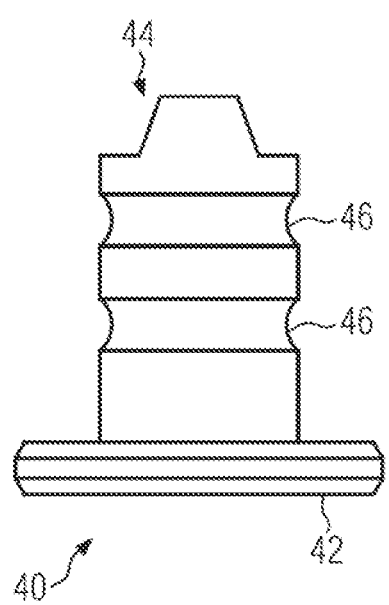
Figure 6B:
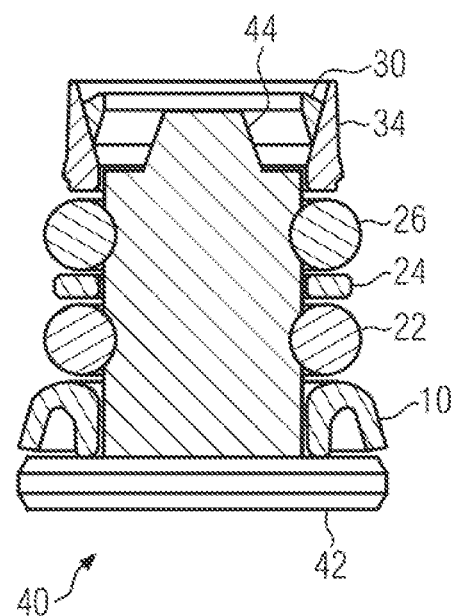
FIGS. 6b-6d show a sequence of steps which are carried out in a method using the protection and assembly plug for making a push-in tube connector port according to the present invention.
Figure 6C:
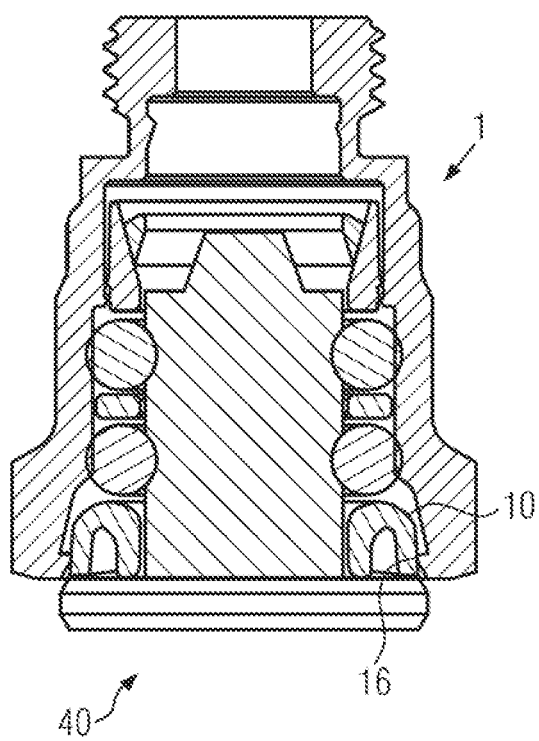

A method for assembling the push-in tube connector plug of FIGS. 1-4 will now be described with reference to FIGS. 6a-6d. In FIG. 6a a protection and assembly plug 40 is shown which comprises an enlarged head portion 42 and a stem portion 44 extending therefrom. This protection and assembly plug 40 has a protection function because it may be inserted into the recess 2 of the tube connector such that the insertion opening of the recess is covered by the enlarged head portion 42 of the protection and assembly plug. FIG. 7 shows the tube connector 1 with the inserted protection and assembly plug 40. The protection and assembly plug 40 may remain in the tube connector 1 until the tube connector 1 is to be used. In this manner the protection and assembly plug 40 provides protection insofar it prevents entry of dirt particles or other foreign material into the recess before the tube connector is first used by inserting a tube, i.e. during storage and transport of the tube connector in connection with a present invention the protection and assembly plug 40 also provides an assembly function as will now be described.

As can be seen in FIG. 6a the stem portion 44 of the protection and assembly plug 40 is provided with two circumferential grooves 46. These circumferential grooves 46 are on the one hand configured to allow placement of the environmental sealing ring 26 and the main sealing ring 22 on the stem portion 44 to be disposed in the region of the two circumferential grooves 46, as can be seen in FIG. 6b. The surface of the stem portion 44 within the region of the annular grooves 46 may be provided with further recesses or small dimples that are provided to hold lubricants for the sealing rings 22 and 26. Lubricants are applied to the grooves 46 before the sealing rings 22 and 26 are placed on the stem portion 44.

The protection and assembly plug 40 is used in a first phase as shown in FIG. 6b. The inner components of the tube connector are subsequently placed around the stem portion 44. First, the locking ring 10 is placed around the stem portion 44 in an orientation such that the open side of its U-shaped cross-section is facing the enlarged head portion 42, wherein the outer edge of the inner ring wall is in abutment against the surface of the enlarged head portion 42. Then, subsequently the environmental sealing ring 22, the spacer ring 24, and the main sealing ring 26 are placed along the stem portion 44. Finally, the insert sleeve 34, with the tube gripping ring 30 disposed therein, is placed around the stem-portion 44. Alternatively, the insert sleeve 34 and the tube gripping ring 30 may be installed in the recess 2 in separate first in which case it would not be present on the stem portion 44 of the protection and assembly plug 40 when the other inner components are installed in the recess as now described.

Above the protection and assembly plug 40 with the inner components placed thereon the body of the tube connector port 1 is shown in an orientation such that the insertion end opening 4 is facing downwards and facing the stem portion 44 of the protection and assembly plug 40. In the next step the body of the connector plug 1 is lowered onto the stem portion 44 of the protection and assembly plug 40 and the inner components placed thereon. In FIG. 6c the body of the tube connector is almost completely lowered onto the stem portion of the protection and assembly plug 40. In FIG. 6c the end phase of the insertion process is shown: The locking ring is urged through the circumferential flange of the insertion end opening, but the locking ring has not yet fully passed the circumferential flange and is still in an inwardly deflected state.

Figure 6D:
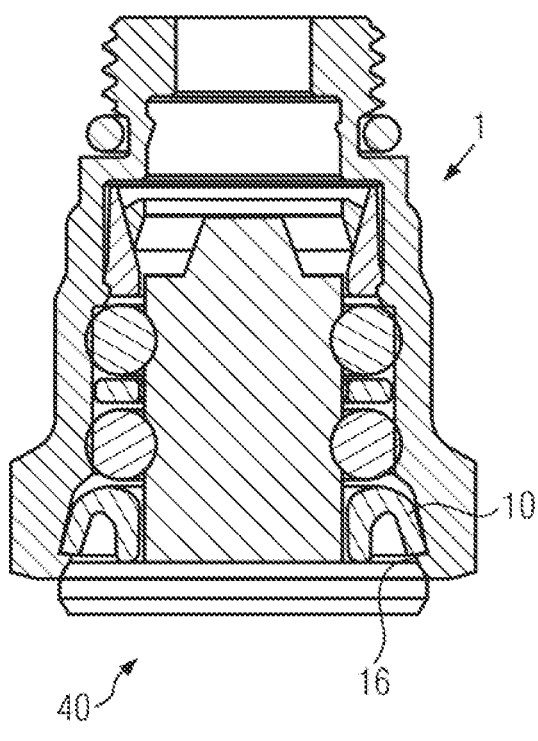
Figure 7:
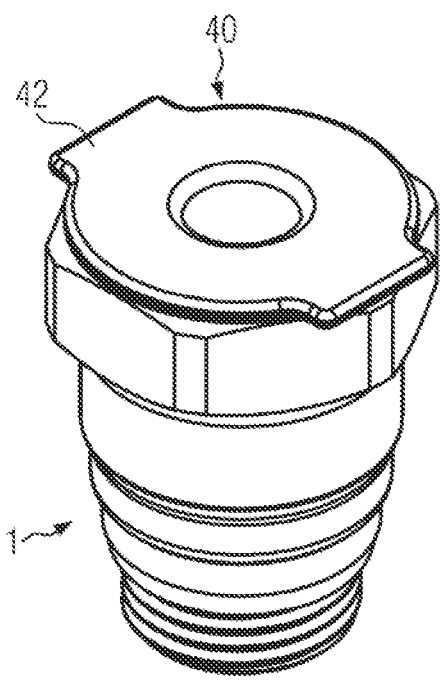
FIG. 7 shows a perspective view of the push-in connector port of FIG. 1 equipped with a protection plug.
Figure 8:
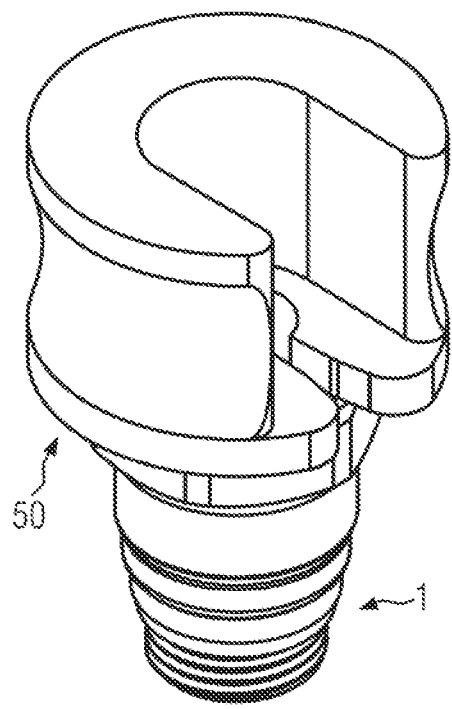
FIG. 8 is a perspective view of the push-in tube connector port of the previous Figures with a release tool inserted into the recess of the push-in tube connector port.

In FIG. 6d the last movement step of the stem portion 44 into the recess of the tube connector 1 has been completed, i.e. the outer edge of the outer ring wall portions of the locking ring have passed the circumferential flange and elastically returned to an inclined state such that the upper edges of the outer ring wall portions 16 are in abutment (see FIG. 3) against the inner surface of the circumferential flange 8, and that the side surfaces of the outer ring wall portions are in abutment against the conically flaring inner wall portion 9 of the recess 2 adjacent to the circumferential flange. In this manner the snap-in engagement of the locking ring 10 within the central recess 2 is completed, and the locking ring 10 is securely retained within the recess 2 so that the protection and assembly plug 40 may now be withdrawn when the state of FIG. 6d had been reached, wherein the inner components remain engaged within the recess. In this manner all inner components of the tube connector have been installed.

Actually the protection and assembly plug 40 may remain in the tube connector in the state as shown in FIG. 6d after the assembly and may serve as a protection until the tube connector port 1 is first to be used. In case that the tube connector port is to be used, the protection and assembly plug 40 is removed and the tube is inserted immediately thereafter. In this respect it is an advantage that the protection and assembly plug held the environmental ring and main sealing ring under a certain compression in the central recess. This compression does not relax immediately after the protection and assembly plug 40 has been removed so that a tube that is inserted after the protection and assembly plug has been removed may be inserted smoothly without increased force because the environmental and main sealing rings are still in a compressed state caused by the protection and assembly plug so that no increased force for compressing the environmental and main sealing rings is needed.

Figure 9:
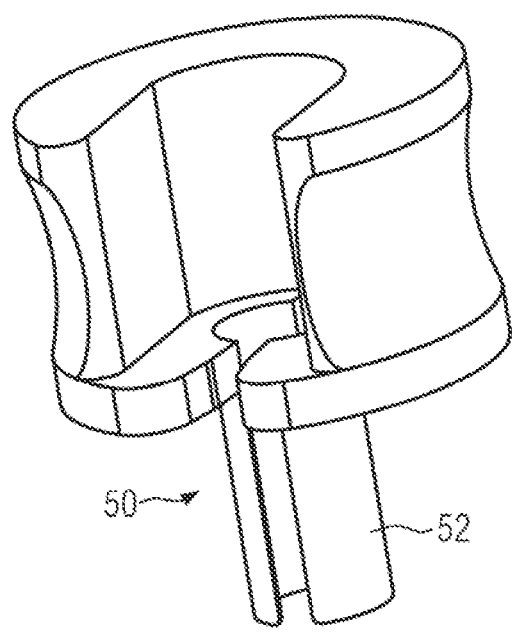
FIG. 9 shows a perspective view of the release tool.
Figure 10C:
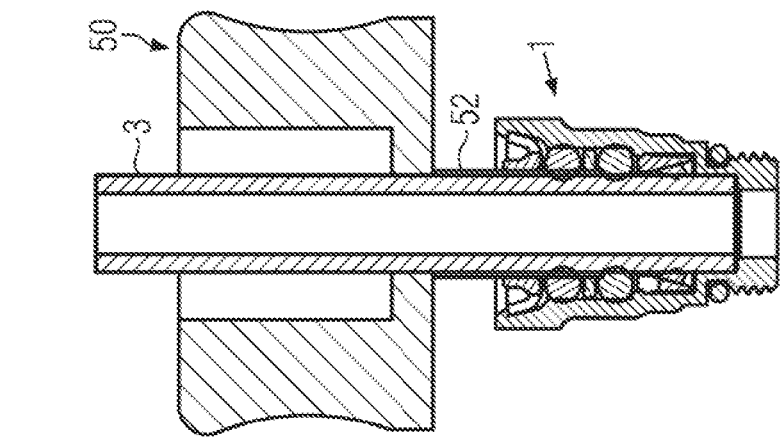
FIGS. 10a-10f show subsequent steps illustrating the way the release tool is applied to release and remove a tube from the push-in tube connector port of the previous Figures.
Figure 10B:
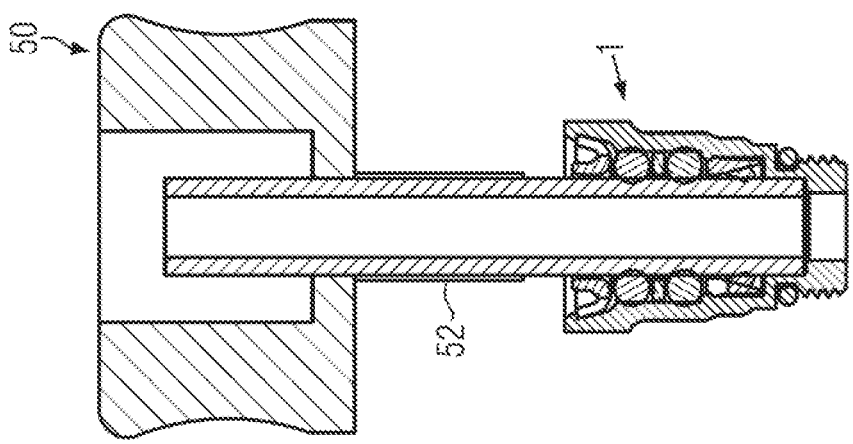
Figure 10A:
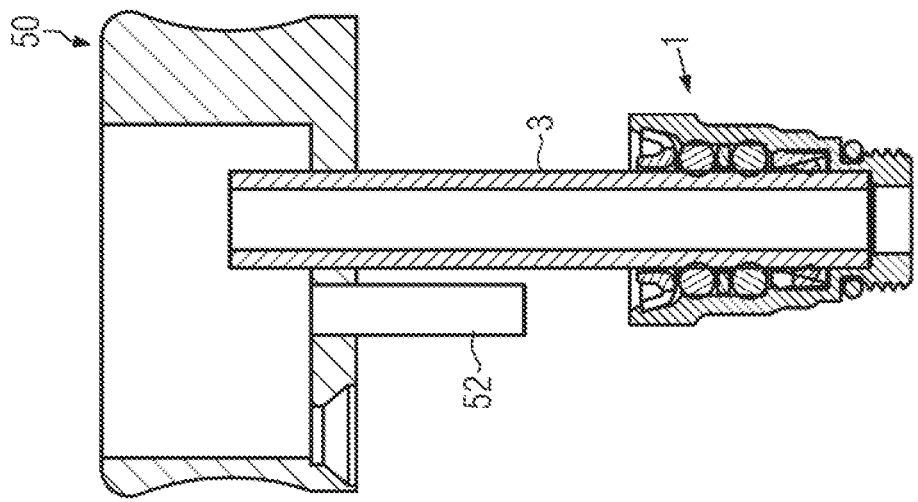

In the following it will be described how a release tool 50, as shown in FIG. 9, may be used to release an inserted tube from the tube connector port 1 in case it has to be pulled out again. The release tool 50 comprises and enlarged handle portion, and extending therefrom an insertion portion 52 which has tubular shape with a longitudinal slot which allows to open the remaining tubular insertion portion 52 by urging opposite portion of the enlarged handle portion a part so that the insertion portion 52 may be placed around an inserted tube in a region outside of the tube connector port 1. The steps of releasing and pulling out a tube from a tube connector are illustrated in FIGS. 10a-10f. In FIGS. 10a and 10b the release tool 50 is placed around the tube 3 in a region outside of the tube connector port 1. The insertion portion 52 partially envelops a portion of the outer wall of the tube 3 in the state of FIG. 10b. Then the release tool 50 is lowered towards the tube connector port 1, wherein in the course of this movement the insertion portion 52 enters the small annular gap between the inner ring wall of the locking ring and the outer wall of the tube, wherein the insertion portion 52 will deflect the inner ring wall, if necessary, to enter into the recess of the tube connector port 1 the insertion portion then passes the environmental sealing ring and the main sealing ring, as shown in FIG. 10c.

Figure 10F:
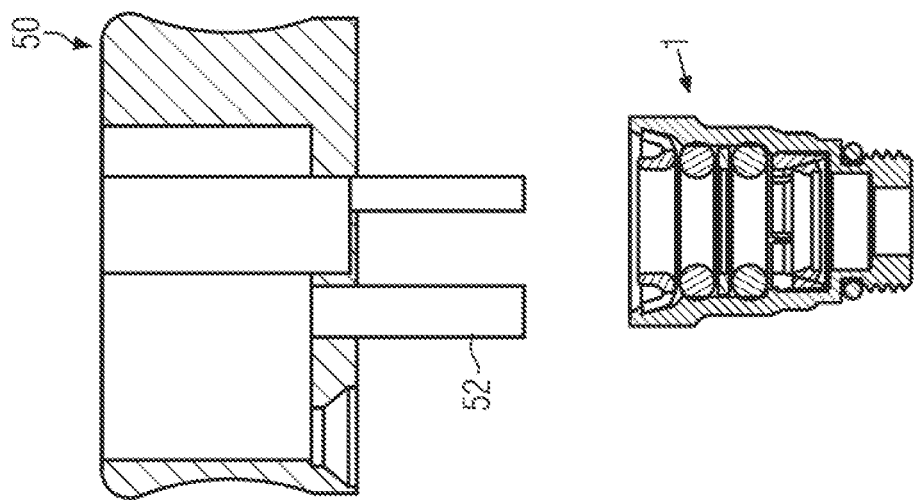
Figure 10E:
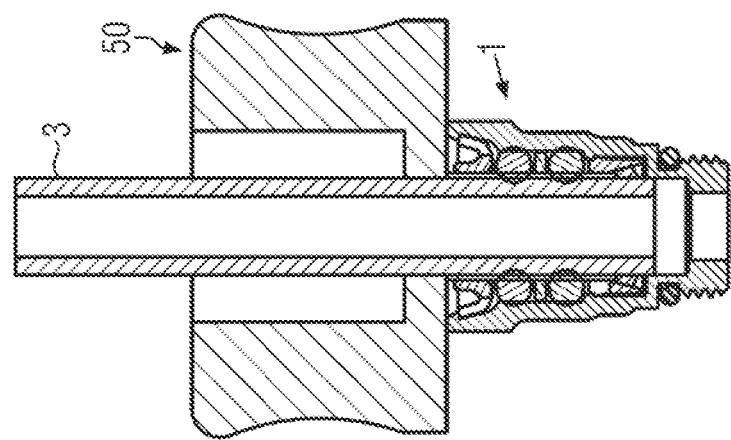
Figure 10D:
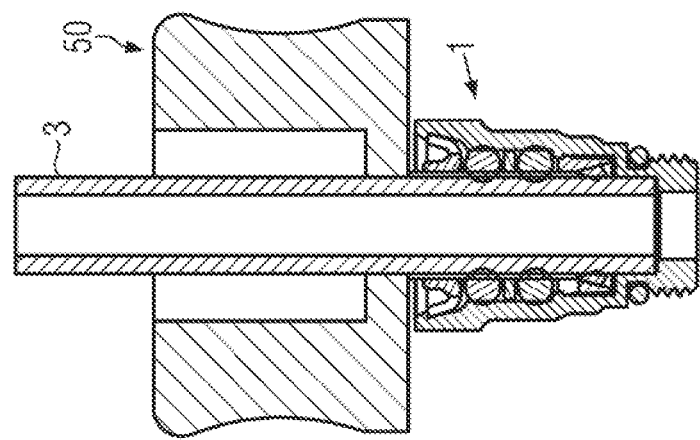

Eventually the front end of the insertion portion 52 approaches the insert sleeve, see FIG. 10d, and then reaches the tube gripping ring to move it slightly with respect to the insert sleeve so that the tube gripping ring is moved along the conical wall portion of the insert sleeve, thereby opening the tube gripping ring which results in disengagement from the tube 3 (see FIG. 10e) which then may be pulled out of the tube connector 1.

Once the tube 3 has been pulled out completely, the release tool may also be pulled out of the tube connector 1, as shown in FIG. 10f, whereafter the tube connector is ready for insertion of the same tube 3 or another tube.

The invention claimed is:

1. A push-in tube connector port for connecting a tube to a pressurized fluid system, the push-in tube connector port comprising:
    a central recess for receiving an end portion of the tube, said recess having an insertion end opening and an abutment end for delimiting the maximum insertion depth of the tube in the recess,
    a sealing arrangement inside of the recess including an environmental sealing ring and further inside the recess a main sealing ring, the main sealing ring being configured to prevent fluid from fluid from flowing out of the tube into the recess when the tube is inserted into the recess,
    a locking ring engaged within the recess and engaging the environmental sealing ring to retain the sealing arrangement inside of the recess and to prevent the environmental sealing ring from being blown out of the recess, and
    a tube gripping ring having an inwardly directed gripping edge and being located closer to the abutment end of the recess than the sealing arrangement, the tube gripping ring being configured to cooperate with a conical wall portion in the recess for delimiting movement of the tube towards the insertion end opening for compressing the tube gripping ring upon such movement to thereby urge the gripping edge further towards the tube to thereby prevent the tube from being pulled out of the recess,
    characterized in that the recess comprises an inwardly projecting circumferential flange at the insertion end opening of the recess, and in that the locking ring comprises an annular double ring component formed by a profile of elastic plastic material having a U-shaped cross-section forming an inner ring wall and an outer ring wall connected to each other by a bottom wall portion of the U-shaped cross-sectional profile, wherein a number of circumferentially distributed slots subdivides the outer ring wall into a number of outer ring wall portions configured to be elastically deflected towards the center by the flange of the insertion end opening, when the annular double ring component is pressed into the recess, and to elastically flex back outwardly once the outer ring wall portions have passed the flange such that an upper edge of each of the outer ring wall portions engages an inner surface of the flange to secure the locking ring in the recess.

2. The push-in tube connector port according to claim 1, characterized in that the elasticity of the material and wall thickness of the U-shaped cross-sectional profile of the locking ring are selected such that the inner ring wall is, when the tube is bent and contacts the inner ring wall, capable of following the bending movement of the tube by displacement of the inner ring wall with respect to the outer ring wall.

3. The push-in tube connector port according to claim 1, characterized in that an upper edge of the inner ring wall of the locking ring extends further away from the bottom wall portion than the upper edges of the outer ring wall portions.

4. The push-in tube connector port according to claim 1, characterized in that the outer ring wall portions of the locking ring are outwardly inclined with respect to the central axis of the outer ring wall such that the outer ring wall portion are flaring in a direction away from the bottom wall portion.

5. The push-in tube connector port according to claim 4, characterized in that the inner wall of the recess adjacent to the flange has a frustoconical shape flaring towards the flange, and in that the outer ring wall portions of the locking ring are outwardly inclined with respect to the central axis of the outer ring wall to an extent such that the outer ring wall portions, when they elastically flex back outwardly once the outer ring wall portions have passed the flange, come into abutment on the flaring inner wall of the recess adjacent to the flange.

6. The push-in tube connector port according to claim 1, wherein the sealing arrangement further comprises a spacer ring in the recess between the environmental sealing ring and the main sealing ring, and in that the bottom wall portion of the locking ring is in abutment against the environmental sealing ring to retain the sealing arrangement inside the recess.

7. The push-in tube connector port according to claim 1, characterized in that the inner wall of the central recess is in a region between the tube gripping ring and the abutment end provided with an inwardly projecting feedback projection arranged to create a mechanical feedback signal by creating an increased resistance force against further advancing movement of the tube due to elastic deformation of the tube wall to allow the tube to slide past the feedback projection.

8. The push-in tube connector port according to claim 7, characterized in that a guiding projection is provided on the inner wall of the recess disposed diametrically opposite to the feedback projection and includes a rising portion of increasing projection height from the inner wall of the recess to ensure that the tube contacts the feedback projection when the tube is pushed further into the recess.

9. The push-in tube connector port according to claim 1, characterized in that a protection and assembly plug is inserted into the recess and comprises an enlarged head portion for covering and closing the insertion end opening and an inner stem portion having a diameter allowing the stem portion to pass through the sealing arrangement and to abut against the environmental sealing ring and the main sealing ring to hold the environmental and main sealing rings under precompression.

10. The push-in tube connector port according to claim 9, characterized in that the stem portion of the protection and assembly plug is provided with two circumferentially extending grooves dimensioned and positioned on the stem portion to engage the environmental sealing ring and the main sealing ring, respectively, and being configured to hold lubricant for the environmental sealing ring and the main sealing ring.

11. A method for making a push-in tube connector port comprising the steps:
   providing a protection and assembly plug having an enlarged head portion for covering and closing an insertion end opening and a stem portion extending from an enlarged head portion;
   placing a locking ring around the stem portion in an orientation such that an annular opening between an inner ring wall and an outer ring wall faces a surface of the enlarged head portion surrounding the stem portion; and
   inserting the stem portion into a recess and advancing the protection and assembly plug further until the enlarged head portion comes into abutment on a surface of the push-in tube connector port surrounding the insertion end opening, thereby advancing the outer ring wall, an outer ring wall portions of which are flexing inwardly while passing a flange, passed the flange of the insertion end opening of the recess such so that the outer ring wall portions flex back outwardly and the upper edges of the outer ring wall portions come into abutment on the inner surface of the flange in the recess.

12. The method according to claim 11, comprising, before the step of inserting the stem portion into the recess, the further sequence of steps:
   placing an environmental sealing ring around the stem portion;
   placing a spacer ring around the stem portion;
   placing a main sealing ring around the stem portion;
   placing an insert sleeve having an inner wall providing a conical wall portion of the recess and a tube gripping ring inserted into an insert sleeve around the stem portion.

* * * * *